United States Patent
Qi et al.

(10) Patent No.: US 11,107,109 B2
(45) Date of Patent: Aug. 31, 2021

(54) METHOD AND SYSTEM FOR PERSONALIZING OFFERS

(71) Applicant: ALIPAY (HANGZHOU) INFORMATION TECHNOLOGY CO., LTD., Zhejiang (CN)

(72) Inventors: Feng Qi, Hangzhou (CN); Jia Yan, Hangzhou (CN); Zhigang Hua, Hangzhou (CN); Dingxiang Hu, Hangzhou (CN); Yingping Cao, Hangzhou (CN); Shuang Yang, Hangzhou (CN)

(73) Assignee: ALIPAY (HANGZHOU) INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/136,064

(22) Filed: Dec. 29, 2020

(65) Prior Publication Data

US 2021/0118004 A1 Apr. 22, 2021

Related U.S. Application Data

(63) Continuation of application No. PCT/CN2020/071821, filed on Jan. 13, 2020.

(51) Int. Cl.
*G06Q 30/02* (2012.01)
*G06N 20/00* (2019.01)

(52) U.S. Cl.
CPC ......... *G06Q 30/0224* (2013.01); *G06N 20/00* (2019.01); *G06Q 30/0202* (2013.01);
(Continued)

(58) Field of Classification Search
CPC .......... G06Q 30/0224; G06Q 30/0236; G06Q 30/0226; G06Q 30/0211; G06Q 30/0219;
(Continued)

(56) References Cited

U.S. PATENT DOCUMENTS 7,707,059 B2 * 4/2010 Reed ................. G06Q 30/0202
705/7.31
8,566,167 B2 10/2013 Munjal
(Continued)

FOREIGN PATENT DOCUMENTS

AU 2016200264 B2 10/2017
CA 2908259 A1 4/2016
(Continued)

OTHER PUBLICATIONS

Dheeraj Remella, Turn to Real-Time, Personalized Mobile Offers to Win Customers, 2016 (Year: 2016).*
(Continued)

*Primary Examiner* — Tarek Elchanti

(57) ABSTRACT

Methods, systems, and apparatus, including computer programs encoded on computer storage media, for personalizing offers are provided. One of the methods includes: collecting response data comprising one or more offers made to each of a plurality of users of a platform and one or more corresponding responses, wherein the one or more offers are from a group of offer choices; creating a training dataset comprising the collected response data and one or more features associated with each of the plurality of users; training a machine learning model using the training dataset, wherein the trained machine learning model is configured to predict the plurality of users' responses to future offers; obtaining a plurality of projected profits for the platform using the trained machine learning model, wherein each of the plurality of projected profits corresponds to making one of the group of the predetermined offers to one of the plurality of users.

20 Claims, 8 Drawing Sheets

(52) U.S. Cl.
CPC ..... *G06Q 30/0211* (2013.01); *G06Q 30/0219* (2013.01); *G06Q 30/0222* (2013.01); *G06Q 30/0226* (2013.01); *G06Q 30/0236* (2013.01); *G06Q 30/0239* (2013.01)

(58) Field of Classification Search
CPC .......... G06Q 30/0222; G06Q 30/0202; G06Q 30/0239; G06N 20/00
USPC ................................. 705/7.31, 14.42, 14.13
See application file for complete search history.

(56) References Cited

U.S. PATENT DOCUMENTS

| | | | |
|---|---|---|---|
| 9,357,266 | B2 | 5/2016 | Navarro |
| 10,318,967 | B2 | 6/2019 | Chao et al. |
| 10,839,412 | B2 | 11/2020 | Chauhan |
| 2007/0088610 | A1 | 4/2007 | Chen |
| 2010/0318407 | A1 | 12/2010 | Leff et al. |
| 2013/0138491 | A1 | 5/2013 | Gao et al. |
| 2013/0231999 | A1 | 9/2013 | Emrich et al. |
| 2014/0067554 | A1 | 3/2014 | Heppding |
| 2014/0180790 | A1* | 6/2014 | Boal ................ G06Q 30/0211 705/14.42 |
| 2015/0066609 | A1 | 3/2015 | Steele et al. |
| 2016/0300184 | A1* | 10/2016 | Zamer ................ G06Q 30/016 |
| 2016/0364754 | A1 | 12/2016 | Thube et al. |
| 2016/0379254 | A1 | 12/2016 | Ray et al. |
| 2017/0300939 | A1 | 10/2017 | Chittilappilly et al. |
| 2018/0308133 | A1 | 10/2018 | Geist, Jr. et al. |

FOREIGN PATENT DOCUMENTS

| | | | |
|---|---|---|---|
| CN | 106846041 A | 6/2017 | |
| CN | 107590684 A | 1/2018 | |
| CN | 107818478 A | 3/2018 | |
| CN | 110298707 A | 10/2019 | |
| WO | WO-2008054681 A2 * | 5/2008 | ......... G07F 17/3258 |

OTHER PUBLICATIONS

Written Opinion and International Search Report for PCT Application No. PCT/CN2020/071821 dated Oct. 15, 2020.

* cited by examiner

METHOD AND SYSTEM FOR PERSONALIZING OFFERS

CROSS REFERENCE TO RELATED APPLICATION

The present application is a continuation application of the International Patent Application No. PCT/CN2020/071821, filed with the China National Intellectual Property Administration (CNIPA) of the People's Republic of China on Jan. 13, 2020 and titled "METHOD AND SYSTEM FOR PERSONALIZING OFFERS." The entire contents of the above-identified application are incorporated herein by reference.

TECHNICAL FIELD

The disclosure relates generally to systems and methods for personalizing offers.

BACKGROUND

Organizations such as business entities often offer promotions, bonuses, rewards, or other types of incentives to attract new clients, incentivize employees, strengthen customer loyalty, and so on. Conventional mechanisms to determine the offers may base on coarse-grained rules, such as offering certain promotions during certain time (e.g., Mother's Day, Valentine's day, Christmas), rewarding bonuses to employees based on performance reviews.

By way of an example, an e-commerce platform may make offers to its users in order to attract active users on the platforms, subject to a budget limit. Although promotions or other incentive distributions are not uncommon, it is challenging to maximize the effect of such offer schemes. Existing methods use over-simplified rules (e.g., users in one city get the same offer) to determine the offers in a coarse way. These methods are unable to effectively personalize offers at individual level. Some existing methods adopt a handful manual-rules based on a few features associated with users, but are unable to deal with large scale use cases such as millions of users hosted by today's e-commerce platforms. It is thus desirable to utilize computing power to accurately determine and provide personalized offers, in order to improve the effectiveness of the incentive scheme.

SUMMARY

Various embodiments of the present specification may include systems, methods, and non-transitory computer readable media for personalizing offers.

According to one aspect, the method for personalizing offer may comprise: collecting response data comprising one or more offers made to each of a plurality of users of a platform and one or more corresponding responses, wherein the one or more offers are selected from a group of offer choices; creating a training dataset comprising the collected response data and one or more features associated with each of the plurality of users; training a machine learning model using the training dataset, wherein the trained machine learning model is configured to predict the plurality of users' responses to future offers; obtaining a plurality of projected profits for the platform using the trained machine learning model, wherein each of the plurality of projected profits corresponds to making one of the group of the predetermined offers to one of the plurality of users; and determining, based on the plurality of projected profits, a combination of one or more offers from the group of offer choices for distributing to the plurality of users to maximize a total profit, subject to a total cost limit of the platform.

In some embodiments, the plurality of users may comprise online sellers; and the one or more features may comprise one or more of the following: seller age, seller gender, seller location, time of registration on the platform, transaction volume, and merchandise information.

In some embodiments, the creating a training dataset may comprise: generating a plurality of data entries each comprising the one or more features of a corresponding user and one of the one or more offers made to the corresponding user; and labeling the plurality of data entries based on the one or more corresponding responses.

In some embodiments, the group of offer choices may comprise an offer choice representing not making an offer.

In some embodiments, the determined combination of one or more offers from the group of offer choices may be a combination with repetition; and the determined combination may comprise N elements, N being the number of the plurality of users.

In some embodiments, the method may further comprise: randomly selecting one or more users from the plurality of users; and making one or more offers randomly selected from the group of offer choices to the randomly selected one or more users.

In some embodiments, a number of the plurality of users may be N; a number of the offer choices may be M; and the determining a combination of one or more offers from the group of offer choices for distributing to the plurality of users may comprise: solving an optimization to obtain an N*M matrix X, each element $X_{ij}$ of X comprising a value indicating a recommendation about making an $j_{th}$ offer to an $i_{th}$ user, wherein $\forall i \in \{1, \ldots, N\}$, $\forall j \in \{1, \ldots, M\}$, $X_{ij} \in \{0,1\}$, and $\Sigma_j X_{ij} = 1$.

In some embodiments, the optimization may comprise an integer programming model; and the each element $X_{ij}$ of X may comprise a binary value indicating whether to make the $j_{th}$ offer to the $i_{th}$ user.

In some embodiments, the total profit may be determined based on, among the plurality of users, a number of users predicted by the machine learning model to accept the one or more offers.

In some embodiments, the one or more of the offer choices may be respectively associated with one or more bonus rewards; and the total cost limit may comprise a limit of a total amount of the bonus rewards for distributing to the plurality of users.

In some embodiments, the one or more bonus rewards may be conditioned on the online sellers conducting online transactions using a payment system associated with the platform.

In some embodiments, the total cost limit may comprise a limit of a number of offers for distributing to the plurality of users.

According to another aspect, a system for personalizing offers may comprise a plurality of sensors and a computer system that comprises a first computing device and a second computing device, the computer system comprising a processor and a non-transitory computer-readable storage medium storing instructions executable by the processor to cause the system to perform operations comprising: collecting response data comprising one or more offers made to each of a plurality of users of a platform and one or more corresponding responses, wherein the one or more offers are selected from a group of offer choices; creating a training dataset comprising the collected response data and one or more features associated with each of the plurality of users; training a machine learning model using the training dataset, wherein the trained machine learning model is configured to predict the plurality of users' responses to future offers; obtaining a plurality of projected profits for the platform using the trained machine learning model, wherein each of the plurality of projected profits corresponds to making one of the group of the predetermined offers to one of the plurality of users; and determining, based on the plurality of projected profits, a combination of one or more offers from the group of offer choices for distributing to the plurality of users to maximize a total profit, subject to a total cost limit of the platform.

According to yet another aspect, a non-transitory computer-readable storage medium for personalizing offers may be configured with instructions executable by one or more processors to cause the one or more processors to perform operations comprising: collecting response data comprising one or more offers made to each of a plurality of users of a platform and one or more corresponding responses, wherein the one or more offers are selected from a group of offer choices; creating a training dataset comprising the collected response data and one or more features associated with each of the plurality of users; training a machine learning model using the training dataset, wherein the trained machine learning model is configured to predict the plurality of users' responses to future offers; obtaining a plurality of projected profits for the platform using the trained machine learning model, wherein each of the plurality of projected profits corresponds to making one of the group of the predetermined offers to one of the plurality of users; and determining, based on the plurality of projected profits, a combination of one or more offers from the group of offer choices for distributing to the plurality of users to maximize a total profit, subject to a total cost limit of the platform.

Embodiments disclosed in the specification have one or more technical effects. In one embodiment, the disclosed methods and systems train a machine learning model based on features associated with each individual user, and historical offer information comprising offers made to the users and their corresponding responses. In one embodiment, the model is trained to learn the users' demand curves and predict the users' responses to future offers. In one embodiment, since the training data is at individual user level (e.g., each user's features and demand curve), the predictions made by the model are more accurate and adaptive. In one embodiment, the disclosed methods and systems search for an optimal offer-distributing plan for an entity (e.g., an e-commerce platform) to distribute a plurality of offers to a plurality of users to maximize an objective (e.g., the overall benefit or profit to the entity by distributing the offers using the solution). The searching may be described with an optimization model. One or more decision variables or coefficients of the optimization model are precalculated based on predictions made by the trained machine learning model. In one embodiment, the individual user level prediction enables the optimization model to provide accurate decision-making. In one embodiment, the optimization model may start with an initial offer-distributing plan, and iteratively improve the plan to maximize the objective function. In one embodiment, the iterative searching approach offers better control over the quality of the final solution. In one embodiment, the optimization problem may be solved by parallel processing, effectively enables the methods and systems to handle scenarios at scale.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

The approaches disclosed herein may optimize the accuracy and efficiency of personalizing offers (e.g., incentives, bonuses) for sellers (e.g., merchandisers) in an ecommerce platform. In order to maintain a healthy size of daily active sellers, strengthen customer loyalty, and/or promote the ecommerce platform's ecosystem, the ecommerce platform may offer sellers bonuses for conducting transactions for using other services provided by the ecosystem, such as a payment service. The bonuses may be claimed by the sellers as coupons, cash, reward points, another suitable form of reward, or any combination thereof. In some embodiments, the bonuses may be accumulated to form an insurance (e.g., medical insurance) coverage to reimburse certain types of expenses. In some embodiments, claiming the bonuses may require the sellers to (1) perform one or more operations (e.g., conducting an online transaction through a specified payment service platform) and (2) log in the application of the ecommerce platform and click one or more specified buttons.

In some embodiments, the bonus amount in each offer may be important to the quality of relationship between the sellers and the platform. While offering large size bonuses may incentivize more sellers to stay active with the platform and perform required operations, the strategy of personalizing offers may subject to a budget limit determined by the ecommerce platform.

In addition to the budget limit, the strategy may also need to consider the uniqueness of each seller. Different sellers may have different levels of sensitivity towards the same offer. The different levels of sensitivity may be related to various features associated with the sellers. For example, one of the top sellers on the ecommerce platform (e.g., in terms of revenue) and a novice seller with limited revenue may react differently towards a small size bonus. As another example, if the bonuses have restricted uses (e.g., only redeemable for eligible medical expenses), a seller who has a full-time job that offers comprehensive employee medical benefits may not be as interested in such bonuses as those without medical insurance. Yet another example, an older seller may be more interested in such medical bonus program than a younger and healthier seller. In some embodiments, these various features of the sellers may be readily available to the platform (e.g., sellers are required to provide information during registration).

Figure 1:
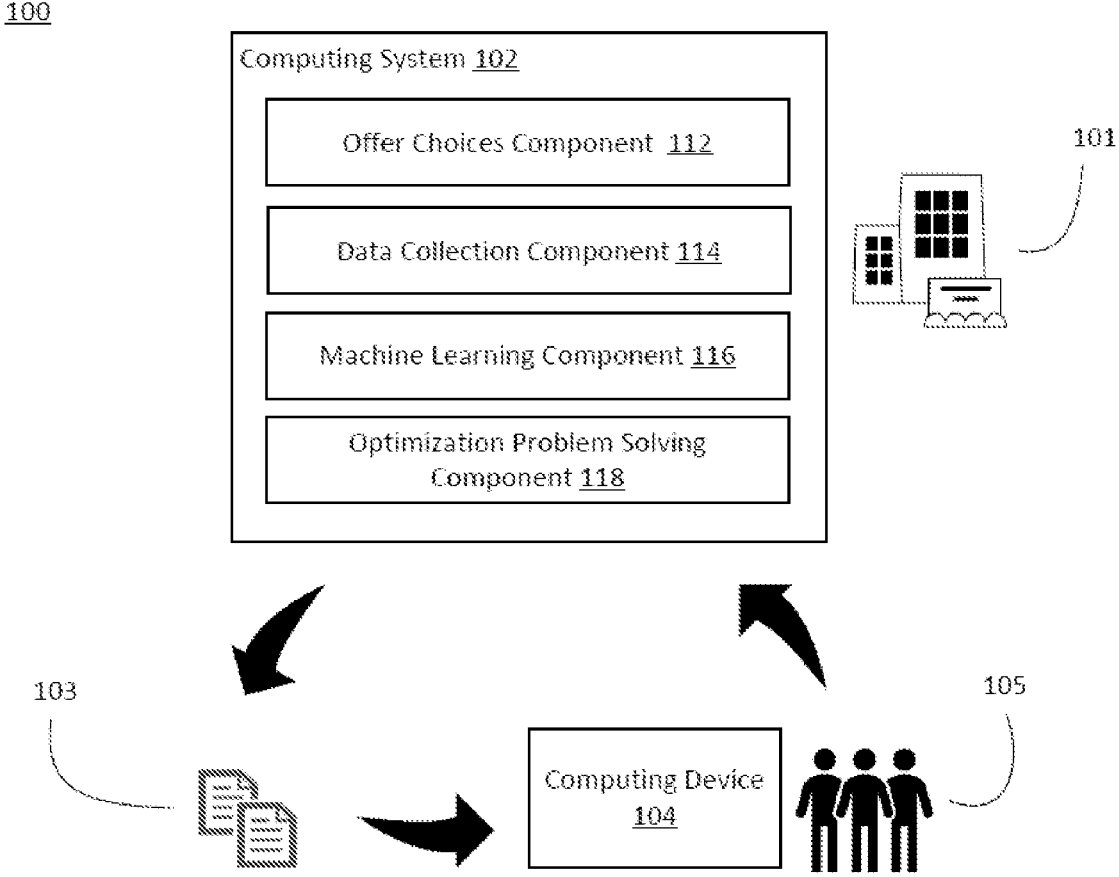
FIG. 1 illustrates an example environment for personalizing offers may be applied, in accordance with various embodiments.

FIG. 1 illustrates an example environment for personalizing offers may be applied, in accordance with various embodiments. The environment 100 may comprise an entity 101, a computer system 102 associated with the entity 101, one or more offers 103, one or more computing devices 104 associated with one or more users 105. In some embodiments, the entity 101 may be a business (e.g., a corporation, a company, a partnership), an educational institution (e.g., a college, a university), or another suitable type of entity. The computer system 102 associated with the entity 101 may comprise a computer server with computing and storage capacities, a data center, a gateway device connected to cloud services, another suitable computing device, or any combination thereof. The one or more offers 103 may comprise raises (e.g., for employees), promotions (e.g., for employees, customers), discounts, other suitable incentives, or any combination thereof. The one or more computing devices 104 associated with one or more users 105 may be implemented on or as various devices such as a mobile phone, tablet, server, desktop computer, laptop computer, etc. The computer system 102 may communicate with the computing devices 104, or other computing devices over the internet, through a local network (e.g., LAN), through direct communication (e.g., BLUETOOTH, radio frequency, infrared), etc. The one or more users 105 may comprise employees, customers, users, other suitable roles that may be incentivized, or any combination thereof.

In some embodiments, the computing system 102 associated with the entity 101 may comprise multiple components, such as offer choices component 112, data collection component 114, machine learning component 116, optimization problem solving component 118. In some embodiments, the offer choices component 112 may store various types of offers to be distributed to the users 105. As an example, in a company/employee context, the offers may comprise bonuses, raises, promotions, etc. to be offered to employees based on performance reviews. As another example in an ecommerce platform/online seller context, the offers may comprise bonuses, benefits, etc. to be offered to sellers conducting transactions using a payment system associated with the ecommerce platform. In some embodiments, the offer choices component 112 may have multiple options (e.g., dollar amounts) for each of the types of offers. In some embodiments, these offers may be predetermined by the platform, and may update periodically.

In some embodiments, the data collection component 114 may collect user data (e.g., user features) to facilitate personalizing offers for the users. For example, in a company/employee context, the user data may comprise each employee's performance data in the previous quarter or in the past year, growing trend, years of employment, another suitable information, or any combination thereof. As another example, in an ecommerce platform/online seller context, the user data may comprise each seller's personal information (e.g., gender, age, education status, marital status), platform related information (e.g., time of registration, membership category), business information (e.g., locations of warehouses, transaction volume, growing trend, merchandises for sale), another suitable information, or any combination thereof.

In some embodiments, the data collection component 114 may also collect information of historical offers made to the users and the corresponding responses. The information of the historical offers may comprise the sizes of the offers, the timing of the offers, another suitable information, or any combination thereof. For example, a seller using an ecommerce platform may have received five offered bonuses for correspondingly conducting five transactions using a payment system associated with the platform. The seller may have accepted all bonuses, accepted some hefty ones and ignored the rest of them, or ignored all of them. These data may be useful in revealing the seller's willingness of acceptance (e.g., demand curve) towards bonuses of different sizes. As another example, the seller may have accepted all the offered bonuses that were delivered within 5 seconds after the transactions were closed, while ignored all the other bonuses that were delivered the next day. Thus, the data may be used to learn the seller's behavioral patterns.

In some embodiments, the machine learning component 116 may comprise a machine learning model. The machine learning model may be trained by supervised learning, unsupervised learning, semi-supervised learning, reinforcement learning, another suitable learning algorithm, or any combination thereof. In some embodiments, the machine learning model may be trained based on the data collected by the data collection component 114, which may comprise features of the users, historical offers made to the users, and the users' responses. The machine learning model may use a neural network (such as convolutional neural network, deep neural network), a decision tree, a plurality of decision trees (e.g., gradient boost decision trees), another suitable algorithm, or any combination thereof. In some embodiments, the machine learning model may be used to predict a user's response to a future offered bonus.

In some embodiments, the optimization problem solving component 118 may model the task of personalizing offer as an optimization in order to maximize the projected profit (e.g., the number of daily active sellers on the platform) and minimize the cost or keep the cost below a budget.

Figure 2:
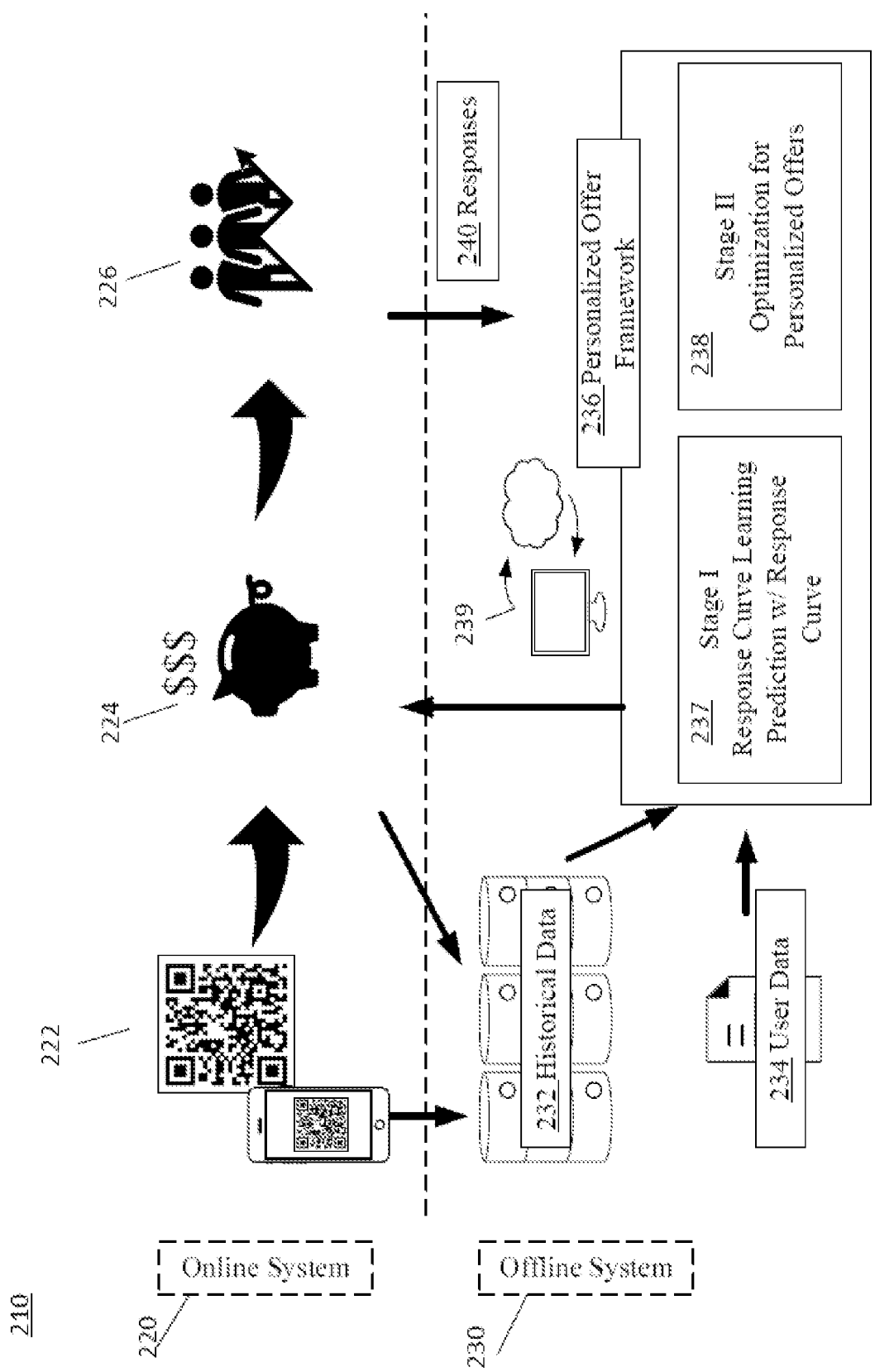
FIG. 2 illustrates an example system for personalizing offers in an example platform, in accordance with various embodiments.

FIG. 2 illustrates an example system for personalizing offers in an example platform, in accordance with various embodiments. The platform 210 shown in FIG. 2 may refer to an ecommerce platform comprising an online system 220 and an offline system 230. The online system 220 may implement a marketplace where users can exchange, sell, or purchase items. The users may comprise individuals, companies, other suitable entities, or any combination thereof. In some embodiments, transactions conducted in the online system 220 may use a payment system associated with the platform 210, such as credit cards issued by banks in partnership with the platform, an online payment Application offered by the platform, another suitable method, or any combination thereof. FIG. 2 shows an example of using a QR code to conduct a transaction. For example, a buyer may scan a QR code provided by a seller to make a payment, and the QR code is associated with a payment system associated with the platform 210. The platform 210 may reward such transactions by offering bonuses to the sellers, the buyers, or both. The offers may promote the payment system, attract new users (e.g., generous bonuses may generate positive publicity), or maintain a healthy size of daily active users of the platform.

In some embodiments, the bonuses offered to the users may be delivered to the users 226 in various manners, such as in-app message, email, SMS, another proper way, or any combination thereof. In some embodiments, the bonuses offered to the users 226 may be claimed by performing certain actions. For example, the user may receive a bonus offer that require using the payment system associated with the platform for a transaction. After the transaction being verified (e.g., using the specified payment system), the user may claim the bonus by logging in his/her account associated with the platform and clicking though one or more buttons or links. In some embodiments, the bonuses claimed by a user 236 may be accumulated in an account 224 associated with the user, such as digital wallet, online bank, another suitable account, or any combination thereof.

In some embodiments, the offline system 230 of the platform 210 may refer to one or more backend servers, data centers, or cloud services where data are stored and processed. The offline system 230 may store historical data 232 associated with transactions 222 that the users 226 conducted, the bonuses 224 offered to the users and the corresponding responses (e.g., acceptance, nonresponse, rejection). In some embodiments, the platform 210 may also store user data 234 in its offline system 230. The user data 234 may include information of a full set of users who registered with the platform 234. For example, each user may be asked during the registration process to provide information including name, age, gender, email, phone number, education level, marital status, annual income, residential location, business location, another suitable information, or any combination thereof. In some embodiments, the user data 234 may also include information of the users' online activities, such as transaction volumes, business growing trends, merchandise categories, another suitable information, or any combination thereof.

In some embodiments, the offline system 230 of the platform 210 may build a personalized offer framework 236 to determine optimal ways to personalize offers for the users 226. The personalized offer framework 236 may be implemented on a computing device 239 (e.g., computer server, cluster of computers, data center, cloud service) as a service, a program, a software, another suitable form, or any combination thereof. The personalized offer framework 236 shown in FIG. 2 comprises multiple stages to determine the personalized bonuses for the users. In some embodiments, the Stage I 237 of the framework 236 may train a machine learning model based on the historical data 232 and the user data 234 to learn response curves (e.g., demand curves) of the plurality of users. Each user's response curve may reflect the user's level of acceptances of the offers in various sizes and may be used to predict the user's responses to future offers.

In some embodiments, the Stage II 238 of the framework 236 may build an optimization model to determine a solution to personalize offers for the users. For example, the problem of finding a combination of offers (e.g., resources) for the users to maximize a profit (e.g., a goal) and subject to a total cost limit (e.g., a constraint) may be modeled as a resource allocation problem and approached by solving a knapsack problem (KP) or its variants. The profit to be maximized may refer to the number of daily active users on the platform 210, which may be determined based on the number of users who claimed received offers during a day. For example, claiming an offer may require a user to take certain actions, which may count as successful interactions between the user and the platform.

In some embodiments, the solution generated by the Stage II 238 of the framework 236 may be deployed to the online system 220. For example, after deployment, each of the users 236 may receive a personalized offer for each transaction conducted using the payment system associated with the platform 210. By observing the users' actual responses 240 (e.g., accepting offers, rejecting offers, nonresponse) to the personalized offers, the offline system 230 may determine whether a goal (e.g., the number of daily active users, a growth target) has been met, and adjust its budge accordingly. For example, if the number of daily active users has fallen below a threshold, the offline system 230 may increase its budget so that the personalized offer framework 236 may provide a more aggressive solution. As another example, if a goal is overachieved, the offline system 230 may reduce the total cost limit to improve the resource efficiency.

Figure 3:
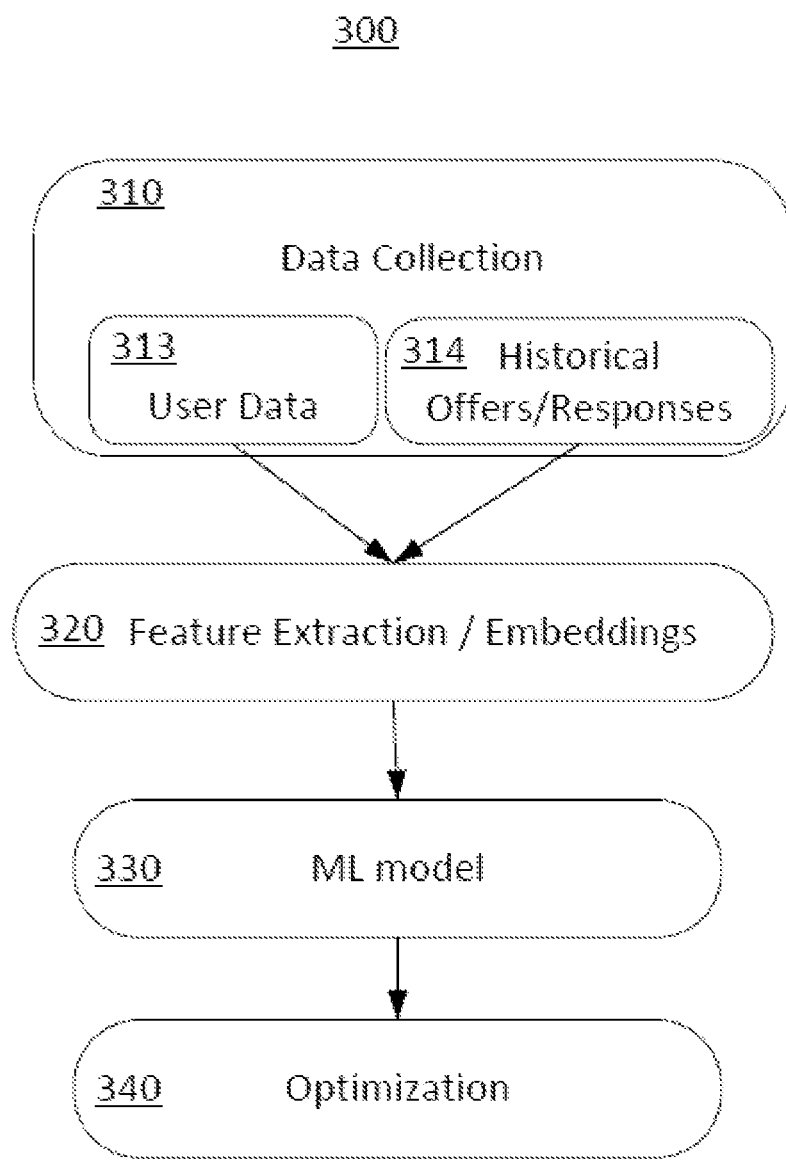
FIG. 3 illustrates an example system flow diagram for personalizing offers, in accordance with various embodiments.

FIG. 3 illustrates an example system flow diagram for making personalized offers, in accordance with various embodiments. The components of the system 300 presented below are intended to be illustrative. Depending on the implementation, the system 300 may include additional, fewer, or alternative components.

In block 310, the system 300 may collect various data such as user data 313, historical offers made to the users and corresponding responses 314. In some embodiments, the data collected by the block 310 may comprise information in natural languages.

In block 320, the system 300 may extract features from the user data 313 and/or the collected historical offers/responses 314 using natural language processing (NLP). In some embodiments, the NLP process may start with word splitting to generate meaningful words or phrases from the information. The word splitting may be designed according to language-specific hyphenation rules. For example, the word splitting may take semantics and contextual meanings into account when processing languages where sentences do not have spaces between words, such as Chinese, Korean and Japanese. As another example, the word splitting may simply break the sentences into words based on whitespaces when processing languages like western languages (e.g., English). In some embodiments, the word splitting may be accomplished by using open source libraries. In some embodiments, the word splitting may also filter out irrelevant words that do not carry actual meanings. In some embodiments, the word splitting may generate a "bag of words," which may be subsequently represented as vectors by using word embedding methods on each word. In some embodiments, the word embedding may be accomplished by using open source libraries and databases such as Glove, vzhong, nlpAthits, Chinese Word Vectors. Word embedding is capable of capturing context of a word in a document, semantic and syntactic similarity, relation with other words, etc. The vector representations of the user features, offers, and responses may be used to train, test, or use the machine learning model in block 330.

In block 340, the system 300 may use an optimization model to determine an optimal way to allocate a plurality of offers to a plurality of users to maximize the projected profit (e.g., the number of daily active sellers on the platform) and limit the cost (e.g., the total amount of bonuses distributed is subject to a budge). In some embodiments, such optimization may be solved by using tools such as Knapsack Problems (KPs) solvers.

Figure 4:
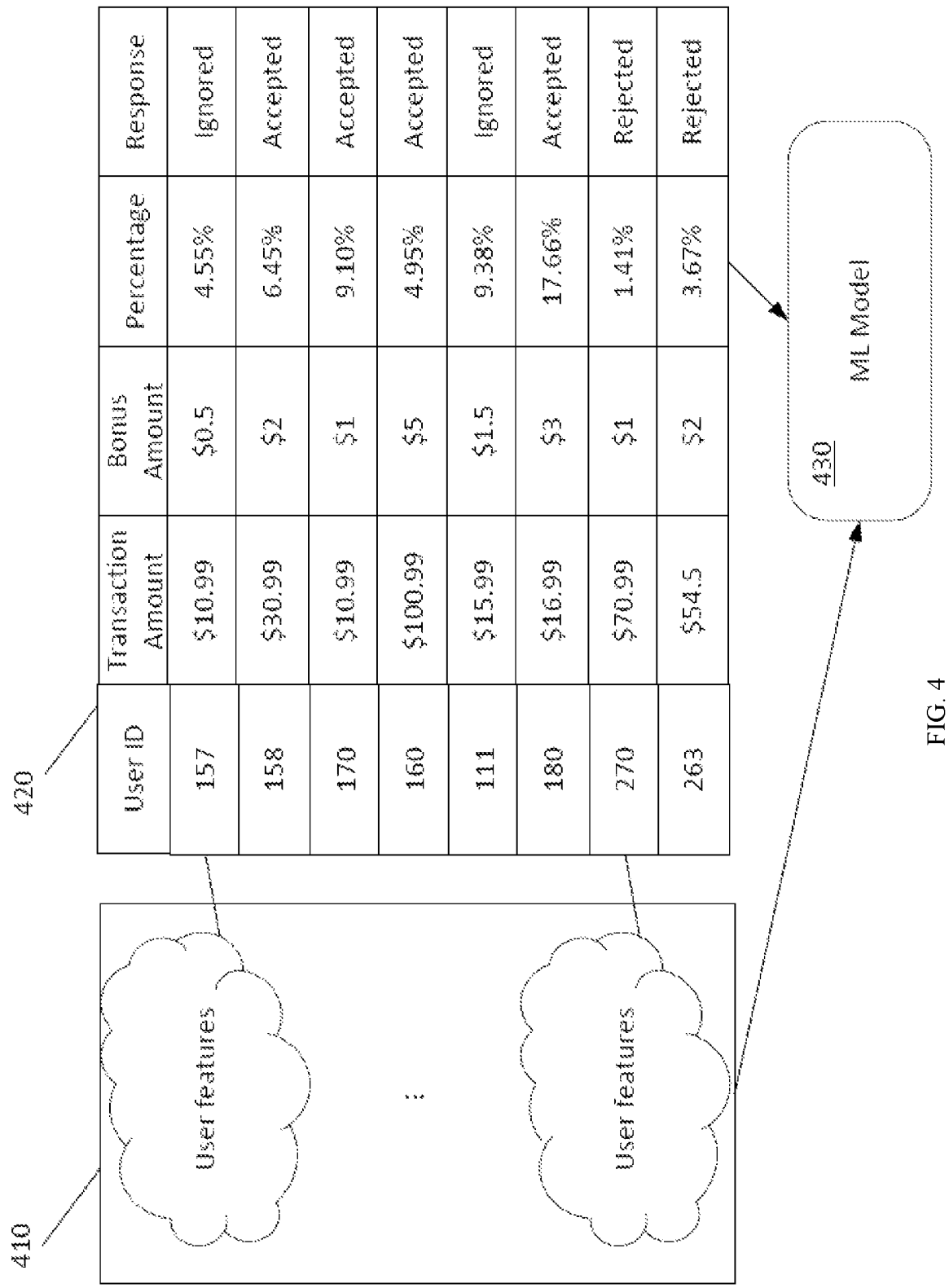
FIG. 4 illustrates an example data collection process for personalizing offers, in accordance with various embodiments.

FIG. 4 illustrates an example data collection process for personalizing offers, in accordance with various embodiments. The process shown in FIG. 4 may collect data for an online marketplace where users can exchange, sell, or purchase items. As shown, the data to be collected may comprise user data 410 and historical response data 420. In some embodiments, the user data 410 may include various features associated with each of the users, such as name, age, gender, email, phone number, education level, marital status, annual income, residential location, business location, another suitable information, or any combination thereof. In some embodiments, the user data 410 may also include information of the online activities associated with each of the users, such as transaction volumes, business growing trends, merchandise categories.

In some embodiments, the historical response data 420 may comprise one or more offers made to each of the users and the corresponding responses. In some embodiments, the historical response data 420 may be represented using various data structures, such as a table shown in FIG. 4, a tree, a graph, another suitable format, or any combination thereof. In some embodiments, the historical response data 420 may comprise multiple fields, such as User ID (e.g., an identifier of each user), transaction ID (e.g., an identifier of a transaction), transaction amount (e.g., the amount of a transaction for which an offer was made), offer ID (e.g., an identifier of an offer), bonus amount of the offer (e.g., the amount of a bonus offered to a user), response (e.g., whether an offered bonus leads a user to interact with the platform), another suitable field, or any combination thereof.

In some embodiments, the offers to be made to the users may be selected from a group of offer choices. These offer choices may be predetermined according to a budget, and may update when the budget is adjusted. In some embodiments, the offer choices may have different bonus amounts, such as $1.88, $0.5, $1, $5. In other embodiments, the offer choices may comprise different percentages to calculate the exact bonus amounts of the offers.

In some embodiments, a user may response to an offer in various ways, such as accepting the offer, nonresponse, rejecting the offer, or another suitable response. Accepting the offer (e.g., by opening the application associated with the platform, clicking buttons) may indicate a successful interaction between the user and the platform. Nonresponse to the offer and rejecting the offer may indicate the user was either not interested in the offer, or felt insulted by the small size of the offer.

In some embodiments, the User ID field in the response data 420 may be used to map each of the data entries in the response data to the corresponding user's user data. In some embodiments, the user data 410 and the response data 420 may be combined to create a training dataset to train a machine learning model 430. In some embodiments, the training dataset may include a plurality of data entries, with each entry corresponding to one user's response to one received offer. For example, each of the entries may comprise features extracted from the user's user data 410 and offer information extracted from the user's response data 420 (e.g., identified by the User ID field). Each of the data entries may be labeled based on the user's actual response. The training dataset may be used to train the machine learning model 430 to predict the users' responses to future offers.

The machine learning model 430 may be implemented with various algorithms, such as neural network, Gradient Boost Decision Tree (GBDT), or another suitable algorithm. In some embodiments, the GBDT algorithm may be used to build a plurality of weak learners (e.g., small decision trees) to fit the training data. The plurality of weak learners may work collectively to make predictions (e.g., whether a user will accept an offer) in response to input data (e.g., a user's features and an offer to be made to the user). For example, the GBDT algorithm may start with creating a single leaf node representing an initial prediction for every entry in the training data. The initial prediction may use a Logistic Function of the log(odds) to calculate a probability that a random user will accept a random offer, as shown in equation (1).

$$\log(\text{odds}) = \log\left(\frac{\text{num\_accepts}}{\text{num\_rejects}}\right)$$

wherein num_accepts is the number of accepted offers in the training data;

wherein num_rejects is the number of rejected offers in the training data;

$$\text{Probability for a user to accept an offer} = \frac{e^{\log(\text{odds})}}{1 + e^{\log(\text{odds})}} \quad (1)$$

wherein the logistic function (1) converts the log(odds) into probability for classification.

Afterwards, the GBDT algorithm may measure the quality of the initial prediction (e.g., the leaf) by calculating Pseudo Residuals, the difference between the observed responses and the predicted responses. Then, a tree may be constructed using one or more of the fields in the training data to predict the calculated Pseudo Residuals. The tree may be constructed in a greedy manner by choosing the best split points based on purity scores (e.g., Gini) or to minimize a loss. The leaf nodes of this tree may comprise one or more of the Pseudo Residuals. In some embodiments, the number of leaves in the tree may be limited, e.g., the maximum number of leaves is between 8 and 32. Subsequently, based on the log(odds) and the Pseudo Residuals in each of the leaves, the GBDT algorithm may calculate an output value for each of the leaves. After that, the log(odds) in equation (1) may be updated by combining the initial leaf with the new tree scaled with a learning rate (e.g., 0.8). The new log(odds) may be used to make predictions for each of the data entries in the training data. Then a new group of Pseudo Residuals may be calculated to measure the quality of the new predictions. This process may repeat until the number of trees has reached a specified maximum number, or the Pseudo Residuals are smaller than a predetermined threshold.

In some embodiments, if a probability for a user to accept an offer predicted by the trained (e.g., fit to the training data) GBDT model is greater than a threshold (e.g., 0.5, a Receiver Operating Characteristics curve, an Area Under The Curve curve), the machine learning model 430 may determine that the user will accept the offer.

In some embodiments, the machine learning model 430 may be a one-layer tensor-flow (e.g., a neural network) model to fit the training data and learn the response curves of the users. These response curves may be used to describe and predict how the users respond to a spectrum of offer amounts.

Figure 5:
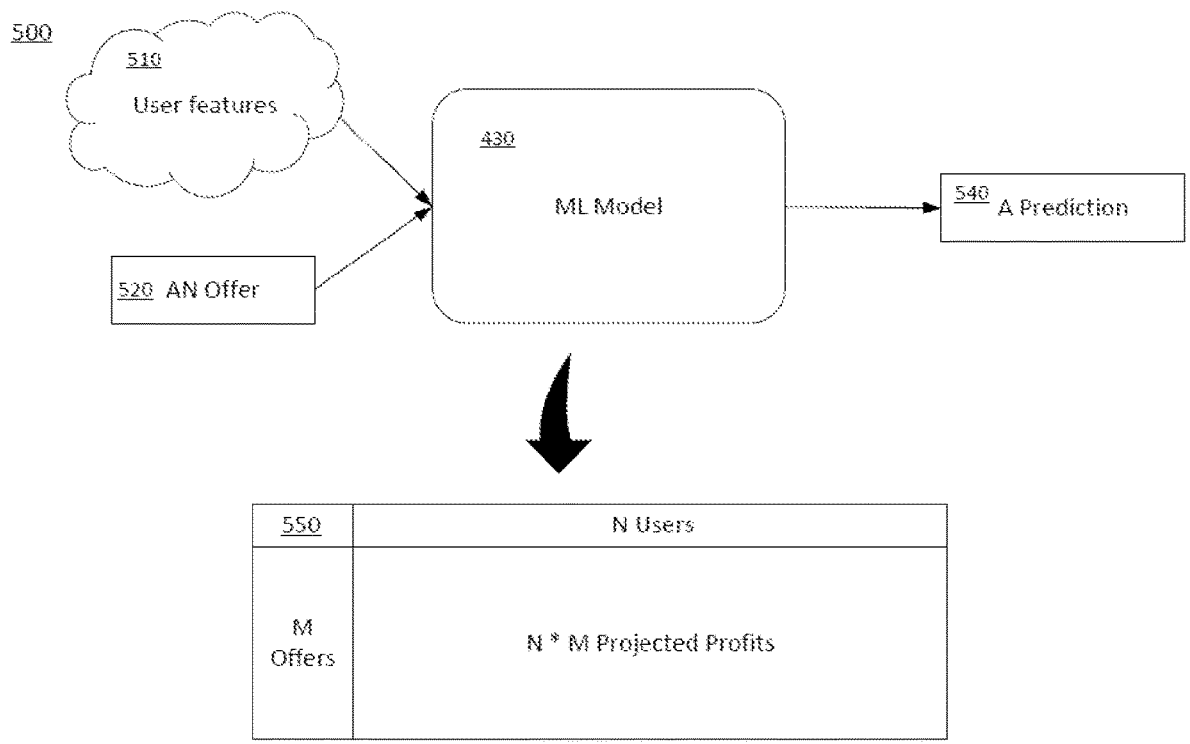
FIG. 5 illustrates an example use of a trained machine learning model for personalizing offers, in accordance with various embodiments.

FIG. 5 illustrates an example use of a trained machine learning model for personalizing offers, in accordance with various embodiments. After being trained, the machine learning model 430 may be used to make predictions on whether a user will accept an offer. As shown in FIG. 5, the machine learning model 430 may receive an inquiry comprising user features 510 and information of an offer 520. The user features 510 may comprise name, age, gender, email, phone number, education level, marital status, annual income, residential location, business location, transaction volumes, business growing trends, merchandise categories, another suitable information, or any combination thereof. The information of the offer 520 may comprise a bonus amount, type of the offer, conditions to accept the offer, limited ways to use the bonus, other suitable information, or any combination thereof.

The trained machine learning model 430 may make a prediction 540 based on the input data. The prediction 540 may be in various format. For example, the prediction may be a probability, a classification (e.g., true/false, yes/no), or another suitable format. The prediction may indicate whether the machine learning model 430 determines that the user with the user features 510 will accept the offer 520.

In some embodiments, the trained machine learning model 430 may be used to prepare a matrix 550 comprising N*M projected profits, wherein N is the number of users, M is the number of offers. A projected profit $P_{ij}$ may correspond to the projected value of making the $j_{th}$ offer to the $i_{th}$ user. In some embodiments, $P_{ij}$ is a function of the prediction generated by the trained machine learning model 430 in response to making the $j_{th}$ offer to the $i_{th}$ user. For example, $P_{ij}$ may be 1 if the $i_{th}$ user is predicted to accept the $j_{th}$ offer, and 0 if the $i_{th}$ user is predicted to ignore or reject the $j_{th}$ offer. As another example, $P_{ij}$ may be equal to the predicted probability of the $i_{th}$ user accepting the $j_{th}$ offer. The purpose of preparing the matrix 550 may include saving repetitive computations when solving the optimization problems shown in FIG. 1 (118), FIG. 2 (238), and FIG. 3 (340).

Figure 6:
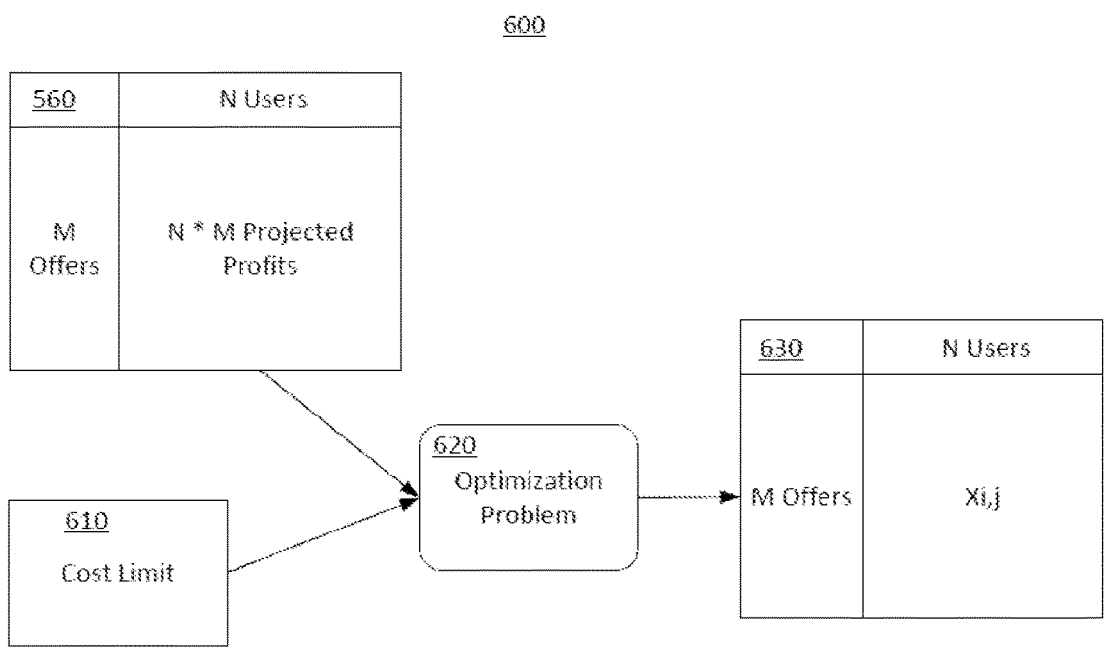
FIG. 6 illustrates an example optimization for personalizing offers, in accordance with various embodiments.

FIG. 6 illustrates an example optimization for personalizing offers, in accordance with various embodiments. As shown in FIG. 6, the prepared matrix of N*M projected profits 560 and the total cost limit 610 may be used to build an optimization problem 620. The objective function of the optimization problem 620 may be represented as equation (2). Solving the objective function may require searching for a matrix 630 of $x_{i,j}$ that maximize the objective function, e.g., a total profit. In some embodiments, the total profit may be calculated by the number of users predicted by the machine learning model to accept the to-be-made offers.

$$\max_{x_{i,j}} \sum_{i=1}^{N} \sum_{j=1}^{M} p_{i,j} x_{i,j}, \text{ s.t.} \sum_{i} \sum_{j} x_{i,j} c_j < B, \quad (2)$$

wherein N is a number of the plurality of users;
wherein M is a number of the plurality of offers;
wherein i is the $i_{th}$ user of the plurality of users, $\forall i \in \{1, \ldots, N\}$;

wherein j is the $j_{th}$ offer of the plurality of offers, $\forall j \in \{1, \ldots, M\}$;
wherein $p_{ij}$ is the projected profit for making the $j_{th}$ offer to the $i_{th}$ user,
wherein $x_{i,j}$ is the decision variable, $x_{ij} \in \{0,1\}$, and $$\sum_{j} x_{ij} = 1.$$

wherein $c_j$ is a cost associated with making $j_{th}$ of fen and
wherein B is a total cost limit.

In some embodiments, the $p_{i,j}$ in equation (2) may be obtained from the N*M matrix 560. In some embodiments, the $p_{i,j}$ may be calculated on demand (e.g., when a particular $p_{i,j}$ is needed in a step to solve the equation (1)) by using the trained machine learning model 430. The on-demand approach may result in repetitive computations causing computing resources waste. However, when the memory space is limited, the on-demand approach may be preferred as it does not require storing the precalculated N*M matrix 560. In some embodiments, the N*M matrix may be sparse (e.g., with many 0s) and may be stored using various data structures rather than a two-dimensional array, such as dictionary of keys (DOK), list of lists (LIL), coordinate list (COO), or another suitable data structure.

In some embodiments, the constraint B in equation (2) may comprise a total cost budget, a total number of offers that each user may receive, a total number of offers for distributing to the plurality of users, another suitable constraint, or any combination thereof. Equation (2) may be updated accordingly to reflect multiple constraints.

In some embodiments, the solution that maximizes the objective function shown as equation (2) may be determined using the method of exhaustion (e.g., try every combination of $x_{i,j}$, and pick the combination that yields the maximum projected profits). However, the method of exhaustion may become impractical when the number of users is a large number. In some embodiments, the objective function shown as equation (2) may be converted into a dual objective function using Lagrangian techniques for dual problem transformation. The dual objective function may be represented as equation (3).

$$\min_{\lambda} \max_{x_{i,j}} \sum_{i=1}^{N} \sum_{j=1}^{M} p_{i,j} x_{i,j} - \lambda \left( \sum_{i} \sum_{j} x_{i,j} c_j - B \right) \quad (3)$$

wherein $\lambda$ is a Lagrangian multiplier, $\lambda \geq 0$
wherein $x_{i,j}$ and $\lambda$ jointly satisfy conditions:

$$\lambda \left( \sum_{i} \sum_{j} x_{i,j} c_j - B \right) = 0$$

$$\sum_{i=1}^{N} \sum_{j=1}^{M} p_{i,j} x_{i,j} - B \leq 0$$

In some embodiments, the dual objective function shown as equation (3) may be formulated as an integer programming model (IP), wherein the $x_{i,j} \in \{0, 1\}$ and $\Sigma_j X_{ij} = 1$. In this way, the equation (3) has $p_{i,j}$, $C_j$, and B as known values, and $X_{i,j}$ and $\lambda$ as unknown values. In some embodiments, the search for the optimal $X_{i,j}$ to maximize $\Sigma_{i=1}^{N} \Sigma_{j=1}^{M} p_{i,j} x_{i,j}$ may start with a random λ to obtain an initial matrix of $x_{i,j}$. The performance of the initial matrix of $x_{i,j}$ may be measured by $\Sigma_{i=1}^{N} \Sigma_{j=1}^{M} x_{i,j} C_j - B$. Depending on the performance of the matrix of $x_{i,j}$, λ may be adjusted accordingly, such as using dual descent algorithm. For example, if $\Sigma_{i=1}^{N} \Sigma_{j=1}^{M} x_{i,j} C_j - B > 0$, λ may be increased according to equation (4).

$$\lambda_{t+1} = \lambda_t + \alpha(\Sigma_{i=1}^{n} \Sigma_{j=1}^{M} x_{i,j} C_j - B) \quad (4)$$

wherein α is a learning rate

In some embodiments, a gradient of λ may be calculated to determine if λ is converged. In response to λ being converged, the searching of $X_{i,j}$ may be terminated. In response to λ not being converged, a new set of $X_{i,j}$ may be calculated based on the updated λ. This process may repeat until the number of repetitions reaches a predetermined value, the quality of the matrix of $x_{i,j}$ has satisfied a predetermined threshold, the λ is converged, or another suitable condition being satisfied.

In some embodiments, for a given λ, the $\Sigma_{i=1}^{N} \Sigma_{j=1}^{M} p_{i,j} x_{i,j}$ portion of equation (3) may be decomposed (e.g., each of the N users may be independently optimized) as equation (5) for each of the users:

$$\text{For } i_{th} \text{ user, } \max_{x_{i,j}} \sum_{j=1}^{M} p_{i,j} x_{i,j} - \lambda \left( \sum_{j} x_{i,j} c_{i,j} - B \right) \quad (5)$$

Since there is no dependence between any two users' optimizations, the optimization problem 620 represented as equation (2) may be solved by using parallel processing techniques, such as multi-threaded processing, GPU/CPU, Map/Reduce, another suitable technique, or any combination thereof.

In some embodiments, besides allocating the offers according to the solution to the optimization problem 620 represented as equation (2), the platform may also make randomly selected offers to one or more randomly selected users. This randomization may serve the purposes of exploring new patterns of response curves to enrich the training dataset.

Figure 7:
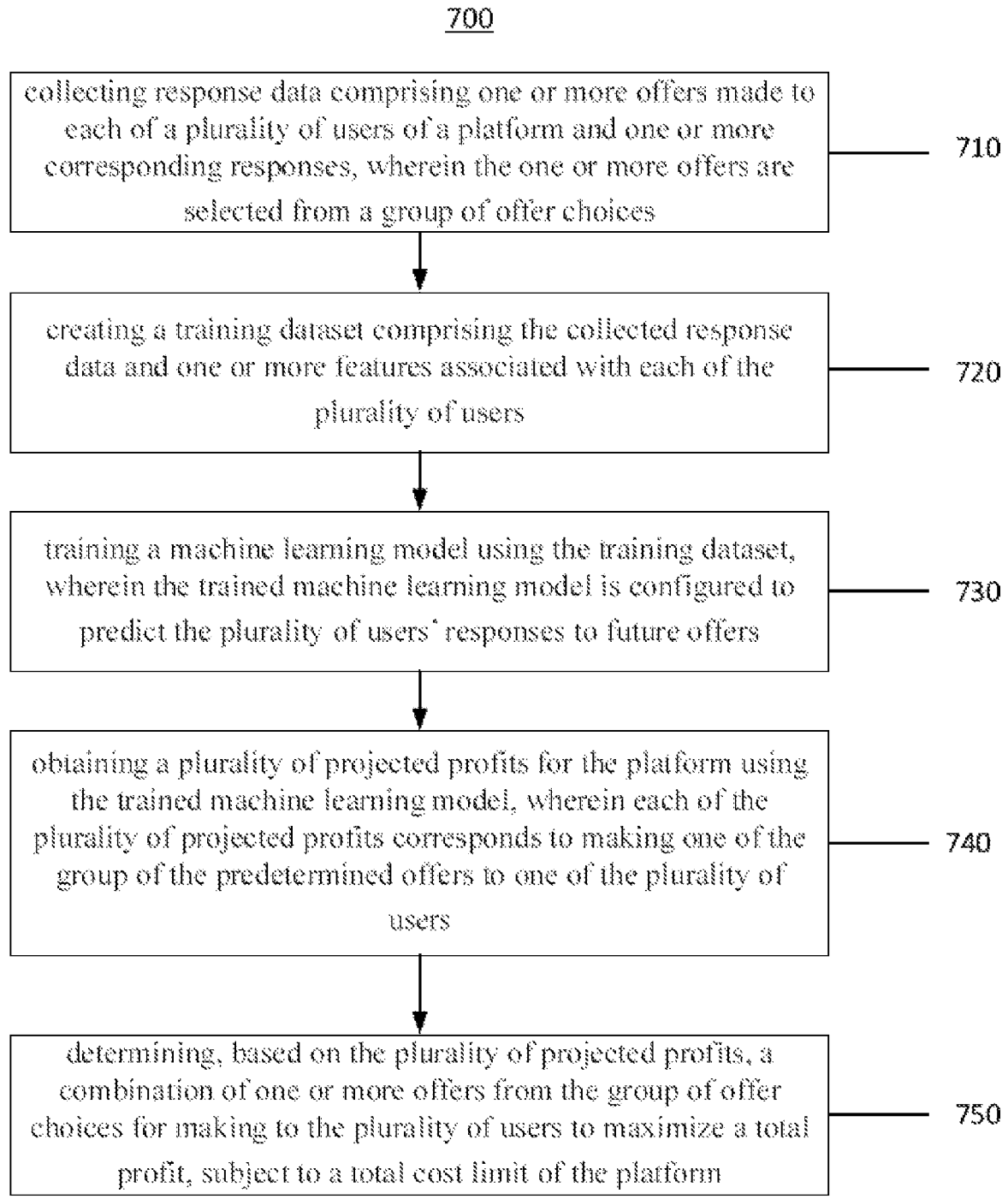
FIG. 7 illustrates a method for personalizing offers, in accordance with various embodiments.

FIG. 7 illustrates a method for personalizing offers, in accordance with various embodiments. The method 700 may be performed by a device, apparatus, or system for personalizing offers for users. The method 700 may be performed by one or more components of the environment or system illustrated by FIGS. 1-9, such as the system 102, 210, and 300. Depending on the implementation, the method 700 may include additional, fewer, or alternative steps performed in various orders or in parallel.

Block 710 includes collecting response data comprising one or more offers made to each of a plurality of users of a platform and one or more corresponding responses, wherein the one or more offers are selected from a group of offer choices. In some embodiments, the plurality of users may comprise online sellers; and the one or more features may comprise one or more of the following: seller age, seller gender, seller location, time of registration on the platform, transaction volume, and merchandise information. In some embodiments, the group of offer choices may comprise an offer choice representing not making an offer.

Block 720 includes creating a training dataset comprising the collected response data and one or more features associated with each of the plurality of users. In some embodiments, the creating a training dataset may comprise: generating a plurality of data entries each comprising the one or more features of a corresponding user and one of the one or more offers made to the corresponding user; and labeling the plurality of data entries based on the one or more corresponding responses.

Block 730 includes training a machine learning model using the training dataset, wherein the trained machine learning model is configured to predict the plurality of users' responses to future offers.

Block 740 includes obtaining a plurality of projected profits for the platform using the trained machine learning model, wherein each of the plurality of projected profits corresponds to making one of the group of the predetermined offers to one of the plurality of users.

Block 750 includes determining, based on the plurality of projected profits, a combination of one or more offers from the group of offer choices for distributing to the plurality of users to maximize a total profit, subject to a total cost limit of the platform. In some embodiments, the determined combination of one or more offers from the group of offer choices may be a combination with repetition; and the determined combination may comprise N elements, N being the number of the plurality of users. In some embodiments, a number of the plurality of users may be N; a number of the offer choices may be M; and the determining a combination of one or more offers from the group of offer choices for distributing to the plurality of users may comprise: solving an optimization to obtain an N*M matrix X, each element $X_{ij}$ of X comprising a value indicating a recommendation about making an $j_{th}$ offer to an $i_{th}$ user, wherein $\forall i \in \{1, \ldots, N\}$, $\forall j \in \{1, \ldots, M\}$, $X_{ij} \in \{0,1\}$, and $\Sigma_j X_{ij} = 1$. In some embodiments, the optimization may comprise an integer programming model; and the each element $X_{ij}$ of X comprises a binary value indicating whether to make the $j_{th}$ offer to the $i_{th}$ user. In some embodiments, the total profit may be determined based on, among the plurality of users, a number of users predicted by the machine learning model to accept the one or more offers. In some embodiments, the one or more of the offer choices may be respectively associated with one or more bonus rewards; and the total cost limit may comprise a limit of a total amount of the bonus rewards for distributing to the plurality of users. In some embodiments, the one or more bonus rewards may be conditioned on the online sellers conducting online transactions using a payment system associated with the platform. In some embodiments, the total cost limit may comprise a limit of a number of offers for distributing to the plurality of users.

In some embodiments, the method 700 may further comprise randomly selecting one or more users from the plurality of users; and making one or more offers randomly selected from the group of offer choices to the randomly selected one or more users.

The techniques described herein may be implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) may be generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof.

Figure 8:
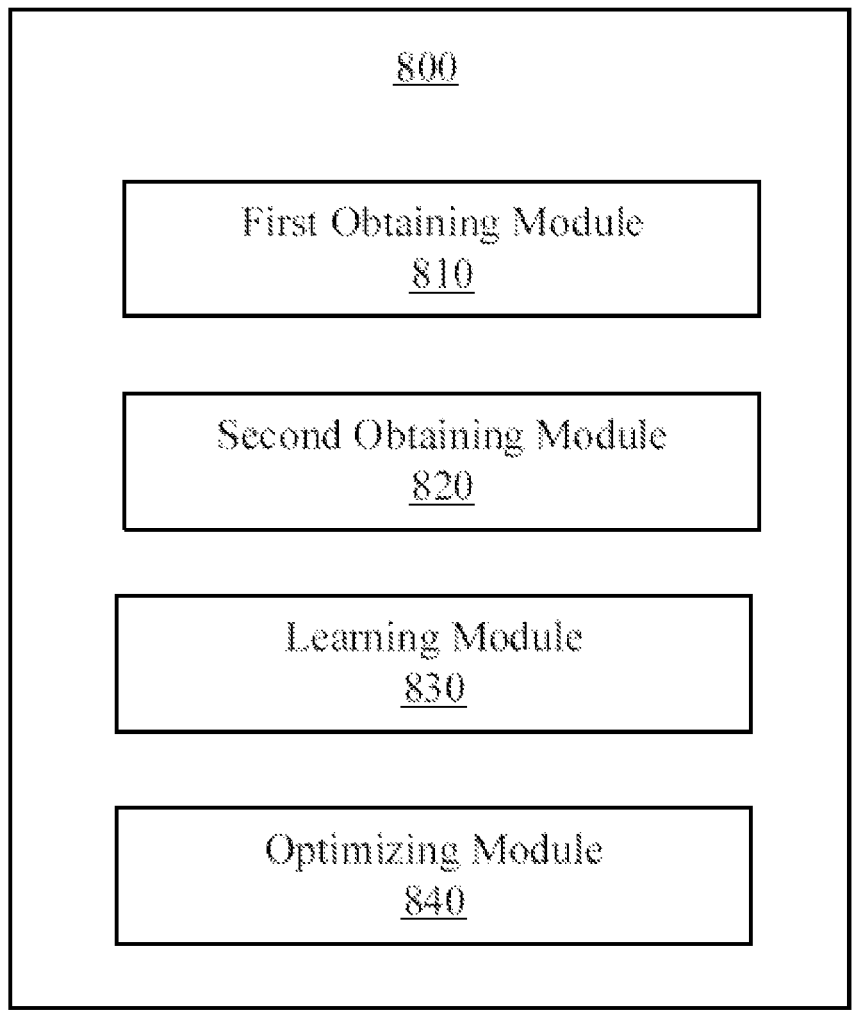
FIG. 8 illustrates a block diagram of a computer system apparatus for personalizing offers, in accordance with some embodiments.

FIG. 8 illustrates a block diagram of a computer system apparatus for personalizing offers, in accordance with some embodiments. The components of the computer system 800 presented below are intended to be illustrative. Depending on the implementation, the computer system 800 may include additional, fewer, or alternative components.

The computer system 800 may be an example of an implementation of one or more components of the computing system 102. The method 700 may be implemented by the computer system 800. The computer system 800 may comprise one or more processors and one or more non-transitory computer-readable storage media (e.g., one or more memories) coupled to the one or more processors and configured with instructions executable by the one or more processors to cause the system or device (e.g., the processor) to perform the above-described method, e.g., the method 300. The computer system 800 may comprise various units/modules corresponding to the instructions (e.g., software instructions).

In some embodiments, the computer system 800 may be referred to as an apparatus for personalizing offers. The apparatus may comprise a first obtaining module 810 for obtaining user data (e.g., user features) to facilitate personalizing offers for the users. For example, in a company/employee context, the user data may comprise each employee's performance data in the previous quarter or in the past year, growing trend, years of employment, another suitable information, or any combination thereof. As another example, in an ecommerce platform/online seller context, the user data may comprise each seller's personal information (e.g., gender, age, education status, marital status), platform related information (e.g., time of registration, membership category), business information (e.g., locations of warehouses, transaction volume, growing trend, merchandises for sale), another suitable information, or any combination thereof.

In some embodiments, the apparatus may also comprise a second obtaining module 820 for obtaining information of historical offers made to the users and the corresponding responses. The information of the historical offers may comprise the sizes of the offers, the timing of the offers, another suitable information, or any combination thereof.

In some embodiments, the apparatus may further comprise a learning module 830 for training a machine learning model based on the data obtained by the first obtaining module 810 and the second obtaining module 820. The machine learning model may use a neural network (such as convolutional neural network, deep neural network), a decision tree, a plurality of decision trees (e.g., gradient boost decision trees), another suitable algorithm, or any combination thereof. In some embodiments, the machine learning model may be used to predict a user's response to a future offered bonus.

In some embodiments, the apparatus may comprise an optimizing module 840 for improving a solution for distributing offers to the users based on an optimization model. The objective function of the optimization model may comprise one or more variables or coefficients. These variables or coefficients may be calculated based on predictions made by the trained machine learning model from the learning module 830.

The first obtaining module 810 and the second obtaining module 820 may collectively correspond to the data collection component 114. The learning module 830 may correspond to the machine learning component 116. The optimizing module 840 may correspond to the optimization problem solving component 118.

Figure 9:
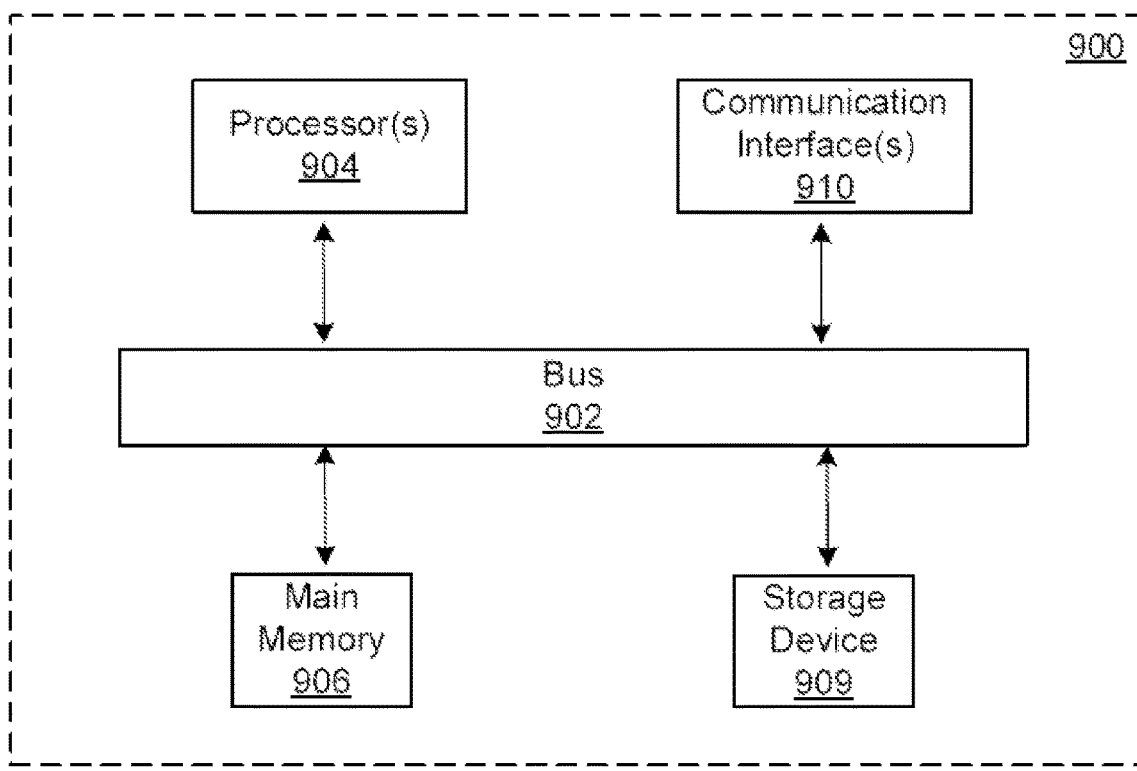
FIG. 9 illustrates an example electronic device in which any of the embodiments described herein may be implemented.

FIG. 9 illustrates an example electronic device in which any of the embodiments described herein may be implemented. The electronic device may be used to implement one or more components of the systems and the methods shown in FIGS. 1-8 The electronic device 900 may comprise a bus 902 or other communication mechanism for communicating information and one or more hardware processors 904 coupled with bus 902 for processing information. Hardware processor(s) 904 may be, for example, one or more general purpose microprocessors.

The electronic device 900 may also include a main memory 906, such as a random-access memory (RAM), cache and/or other dynamic storage devices, coupled to bus 902 for storing information and instructions to be executed by processor(s) 904. Main memory 906 also may be used for storing temporary variables or other intermediate information during execution of instructions to be executed by processor(s) 904. Such instructions, when stored in storage media accessible to processor(s) 904, may render electronic device 900 into a special-purpose machine that is customized to perform the operations specified in the instructions. Main memory 906 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The electronic device 900 may implement the techniques described herein using customized hard-wired logic, one or more ASICs or FPGAs, firmware and/or program logic which in combination with the electronic device may cause or program electronic device 900 to be a special-purpose machine. According to one embodiment, the techniques herein are performed by electronic device 900 in response to processor(s) 904 executing one or more sequences of one or more instructions contained in main memory 906. Such instructions may be read into main memory 906 from another storage medium, such as storage device 909. Execution of the sequences of instructions contained in main memory 906 may cause processor(s) 904 to perform the process steps described herein. For example, the processes/methods disclosed herein may be implemented by computer program instructions stored in main memory 906. When these instructions are executed by processor(s) 904, they may perform the steps as shown in corresponding figures and described above. In alternative embodiments, hard-wired circuitry may be used in place of or in combination with software instructions.

The electronic device 900 also includes a communication interface 910 coupled to bus 902. Communication interface 910 may provide a two-way data communication coupling to one or more network links that are connected to one or more networks. As another example, communication interface 910 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A computer-implemented method for personalizing offers, comprising:
    collecting response data comprising one or more offers made to each of a plurality of users of a platform and one or more observed responses, wherein the one or more offers are selected from a group of offer choices;
    creating a training dataset comprising the collected response data and one or more features associated with each of the plurality of users;
    training a machine learning model using the training dataset, wherein the training comprises:
        creating a leaf node based on the training dataset;
        obtaining predicted responses based on the leaf node and the one or more features; and
        constructing a decision tree based on the one or more features and differences between the predicted responses and the one or more observed responses;
    obtaining a plurality of projected profits for the platform using the trained machine learning model, wherein each of the plurality of projected profits corresponds to making one of the group of offer choices to one of the plurality of users;
    constructing an objective function based on the plurality of projected profits, the objective function comprising a plurality of decision variables;
    converting the objective function into a dual objective function;
    decomposing the dual objective function into a plurality of objectives corresponding to the plurality of users, each of the plurality of objectives comprising a subset of the plurality of decision variables;
    parallelly processing the plurality of objectives to determine values of each subset of the plurality of decision variables;
    determining the values of the plurality of decision variables based on the values of the each subset; and
    determining, based on the values of the plurality of decision variables, a combination of one or more offers from the group of offer choices for distributing to the plurality of users.

2. The method of claim 1, wherein:
    the plurality of users comprise online sellers; and
    the one or more features comprise one or more of the following: seller age, seller gender, seller location, time of registration on the platform, transaction volume, and merchandise information.

3. The method of claim 1, wherein the creating a training dataset comprises:
    generating a plurality of data entries each comprising the one or more features of a corresponding user and one of the one or more offers made to the corresponding user; and
    labeling the plurality of data entries based on the one or more observed responses.

4. The method of claim 1, wherein the group of offer choices comprise: an offer choice representing not making an offer.

5. The method of claim 1, wherein:
the determined combination of one or more offers from the group of offer choices is a combination with repetition; and
the determined combination comprises N elements, N being the number of the plurality of users.

6. The method of claim 1, further comprising:
randomly selecting one or more users from the plurality of users; and
making one or more offers randomly selected from the group of offer choices to the randomly selected one or more users.

7. The method of claim 1, wherein:
a number of the plurality of users is N;
a number of offer choices in the group of offer choices is M; and
the determining a combination of one or more offers from the group of offer choices for distributing to the plurality of users comprises: solving an optimization to obtain an N*M matrix X, each element $X_{ij}$ of X comprising a value indicating a recommendation about making an $j_{th}$ offer to an $i_{th}$ user, wherein $\forall i \in \{1, \ldots, N\}$, $\forall \wedge j \in \{1, \ldots, M\}$.

8. The method of claim 7, wherein:
the optimization comprises an integer programming model; and
the each element $X_{ij}$ of X comprises a binary value indicating whether to make the $j_{th}$ offer to the $i_{th}$ user.

9. The method of claim 1, wherein:
the objective function maximizes a total profit based on, among the plurality of users, a number of users predicted by the machine learning model to accept the one or more offers.

10. The method of claim 1, wherein:
the group of offer choices are respectively associated with one or more bonus rewards; and
the combination of one or more offers is subject to a limit of a total amount of the one or more bonus rewards for distributing to the plurality of users.

11. The method of claim 10, wherein:
the one or more bonus rewards are conditioned on online sellers conducting online transactions using a payment system associated with the platform.

12. The method of claim 1, wherein:
the combination of one or more offers is subject to a limit of a number of offers for distributing to the plurality of users.

13. A system for personalizing offers, comprising one or more processors and one or more non-transitory computer-readable memories coupled to the one or more processors and configured with instructions executable by the one or more processors to cause the system to perform operations comprising:
collecting response data comprising one or more offers made to each of a plurality of users of a platform and one or more observed responses, wherein the one or more offers are selected from a group of offer choices;
creating a training dataset comprising the collected response data and one or features associated with each of the plurality of users;
training a machine learning model using the training dataset, wherein the training comprises:
creating a leaf node based on the training dataset;
obtaining predicted responses based on the leaf node and the one or more features; and
constructing a decision tree based on the one or more features and differences between the predicted responses and the one or more observed responses;
obtaining a plurality of projected profits for the platform using the trained machine learning model, wherein each of the plurality of projected profits corresponds to making one of the group of offer choices to one of the plurality of users;
constructing an objective function based on the plurality of projected profits comprising a plurality of decision variables;
converting the objective function into a dual objective function;
decomposing the dual objective function into a plurality of objectives corresponding to the plurality of users, each of the plurality of objectives comprising a subset of the plurality of decision variables;
parallelly processing the plurality of objectives to determine values of each subset of the plurality of decision variables;
determining the values of the plurality of decision variables based on the values of the each subset; and
determining, based on the values of the plurality of decision variables, a combination of one or more offers from the group of offer choices for distributing to the plurality of users.

14. The system of claim 13, wherein:
the plurality of users comprise online sellers; and
the one or more features comprise one or more of the following: seller age, seller gender, seller location, time of registration on the platform, transaction volume, and merchandise information.

15. The system of claim 13, wherein the creating a training dataset comprises:
generating a plurality of data entries each comprising the one or more features of a corresponding user and one of the one or more offers made to the corresponding user; and
labeling the plurality of data entries based on the one or more observed responses.

16. The system of claim 13, wherein:
the determined combination of one or more offers from the group of offer choices is a combination with repetition; and
the determined combination comprises N elements, N being the number of the plurality of users.

17. The system of claim 13, wherein:
a number of the plurality of users is N;
a number of offer choices in the group of offer choices is M; and
the determining one or more offers for distributing to the plurality of users comprises: solving an optimization to obtain an N*M matrix X, each element $X_{ij}$ of X comprising a value indicating a recommendation about making an $j_{th}$ offer to an $i_{th}$ user, wherein $\forall i \in \{1, \ldots, N\}$, $\forall j \in \{1, \ldots, M\}$.

18. A non-transitory computer-readable storage medium configured with instructions executable by one or more processors to cause the one or more processors to perform operations comprising:
collecting response data comprising one or more offers made to each of a plurality of users of a platform and one or more observed responses, wherein the one or more offers are selected from a group of offer choices;

creating a training dataset comprising the collected response data and one or more features associated with each of the plurality of users;
training a machine learning model using the training dataset, wherein the training comprises:
  creating a leaf node based on the training dataset;
  obtaining predicted responses based on the leaf node and the one or more features; and
  constructing a decision tree based on the one or more features and differences between the predicted responses and the one or more observed responses;
obtaining a plurality of projected profits for the platform using the trained machine learning model, wherein each of the plurality of projected profits corresponds to making one of the group of offer choices to one of the plurality of users;
constructing an objective function based on the plurality of projected profits comprising a plurality of decision variables;
converting the objective function into a dual objective function;
decomposing the dual objective function into a plurality of objectives corresponding to the plurality of users, each of the plurality of objectives comprising a subset of the plurality of decision variables;
parallelly processing the plurality of objectives to determine values of each subset of the plurality of decision variables;
determining the values of the plurality of decision variables based on the values of the each subset; and
determining, based on the values of the plurality of decision variables, a combination of one or more offers from the group of offer choices for distributing to the plurality of users.

19. The storage medium of claim 18, wherein:
the determined combination of one or more offers from the group of offer choices is a combination with repetition; and
the determined combination comprises N elements, N being the number of the plurality of users.

20. The storage medium of claim 18, wherein:
a number of the plurality of users is N;
a number of offer choices in the group of offer choices is M; and
the determining one or more offers for distributing to the plurality of users comprises: solving an optimization to obtain an N*M matrix X, each element $X_{ij}$ of X comprising a value indicating a recommendation about making an $j_{th}$ offer to an $i_{th}$ user, wherein $\forall i \in \{1, \ldots, N\}$, $\forall j \in \{1, \ldots, M\}$.

* * * * *